T. H. WILLIAMS.
LOAF MAKER FOR BREAD.
APPLICATION FILED OCT. 5, 1907.

901,577.

Patented Oct. 20, 1908.

Witnesses
Geo. H. Byrne
H. H. Byrne

Inventor
Thomas H. Williams
Jerry A. Mathews
Attorney

UNITED STATES PATENT OFFICE.

THOMAS H. WILLIAMS, OF HOOD RIVER, OREGON.

LOAF-MAKER FOR BREAD.

No. 901,577.    Specification of Letters Patent.    Patented Oct. 20, 1908.

Application filed October 5, 1907. Serial No. 395,998.

*To all whom it may concern:*

Be it known that I, THOMAS H. WILLIAMS, a citizen of the United States, residing at Hood River, in the county of Wasco and State of Oregon, have invented certain new and useful Improvements in Loaf-Makers for Bread, of which the following is a specification.

My invention relates to loaf makers, and more especially, to machines of this character adapted to receive a given quantity of dough, and form the same into a loaf, ready for the pan.

One object of my invention is to provide a machine of the class described which in large measure eliminates the disagreeable and onerous manual labor incident to the making of bread by the old method.

Another object of the invention is to provide an apparatus whereby all the loaves will be of neat shape and of the same size.

With the above and other objects in view, the invention consists in the construction and arrangement of parts hereinafter described, and illustrated in the accompanying drawings, in which:—

Figure 1:
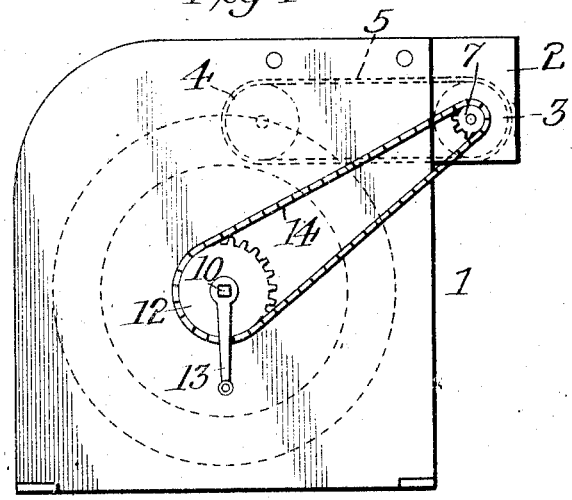
Figure 4:
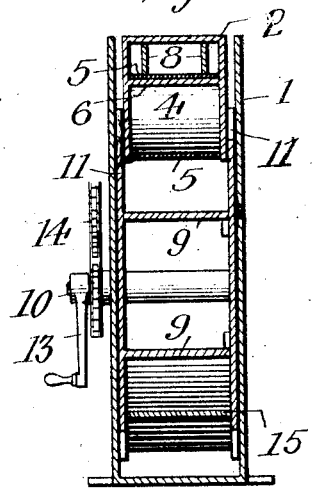
Figure 2:
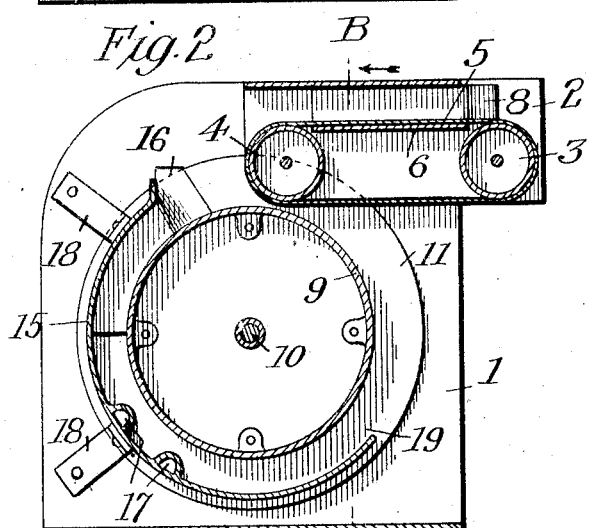
Figure 5:
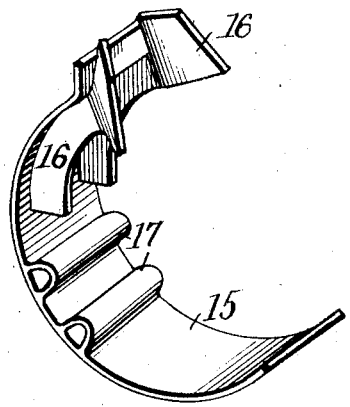
Figure 3:
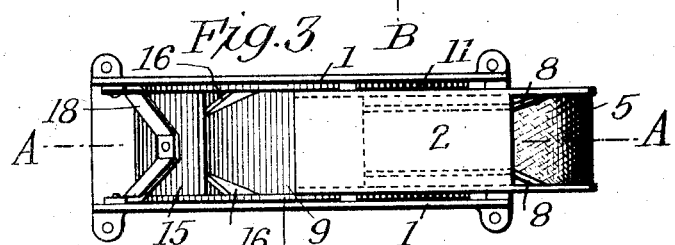

Figure 1 is a side elevation of the machine. Fig. 2 is a central longitudinal section thereof, taken on the line A—A of Fig. 3. Fig. 3 is a plan view of the machine. Fig. 4 is a transverse section taken substantially on the line B—B, of Fig. 2, and looking in the direction of the arrow. Fig. 5 is a perspective view of one of the parts.

Referring to the drawing in detail, my improved loaf maker comprises a frame or casing 1, of any suitable shape, and preferably formed of sheet metal. Near the top of main frame 1 is secured an auxiliary frame 2, of rectangular or box like section. Within this frame 2 are mounted rollers 3, 4, and over these rollers extend an endless belt 5. A partition 6 extends across the frame 2 between the rollers, and serves as a support for the upper stretch of the belt. A sprocket wheel 7, is secured to the shaft of one of the rollers. Guides 8 are located within the frame 2 above the belt, and so disposed as to form a passage between themselves, the top of the frame, and the belt. The outer ends of the guides are bent outwardly so as to form a flaring mouth to said passage.

Mounted upon a shaft 10, disposed centrally in the main frame 2, is a drum 9, provided with a pair of radial flanges, 11. On the outside of the frame, the shaft 10 carries a sprocket wheel 12, and a handle 13, and a chain 14 operatively connects the sprocket wheels 7 and 10. If desired, power may be employed for driving the drum, instead of the handle 13.

Extending partly around the drum 9, is a curved plate 15, filling the space between the two walls of the frame 2, and secured thereto by means of brackets, 18. A pair of curved guide plates 16 are secured to the plate 15, and provided with outwardly flaring, extended ends. It will thus be observed that the curved plate 15, drum 9, and guide 16, serve to form a passage having a hopper shaped mouth at its upper end. A plurality of ribs 17, are formed on the inside of the curved plate 15, for a purpose hereinafter described.

The operation of the machine is as follows; the drum being rotated either by hand or power communicates motion to the rollers and belt by means of the sprocket chain 14. Lumps of dough of the proper size are fed in between the guides 8, at the outer end of the auxiliary frame 2, and are carried inward by the belt being rolled along, and thereby formed into a round, cylindrical shape. When the partially formed loaves reach the inner end of the top stretch of the belt, they fall therefrom on to the drum 9, and are carried by this into the passage formed by the guides 16. The rolling motion imparted to the lumps of dough by the action of the drum is equivalent to the usual "working" or "kneading", and serves to compact them. As the dough is carried around by the drum, it is brought into close contact with the ribs 17. In fact, it is forced past them with considerable pressure and this serves to expel the contained gases the same as the usual manual squeezing. The formed loaves are finally delivered from the machine at 19.

It will thus be seen that I have provided a very simple and effective loaf former or maker, and it is thought the numerous advantages thereof will be readily appreciated by those skilled in the art.

What I claim is:—

A loaf maker comprising a rotatable drum, an arc shaped plate partly surrounding the same and spaced apart therefrom so as to form a passage through which dough is adapted to travel, and a plurality of fixed, transverse ribs projecting from the inside of said plate, and extending across said passage.

In testimony whereof I affix my signature, in presence of two witnesses.

THOMAS H. WILLIAMS.

Witnesses:
 TRUMAN BUTLER,
 ALTON W. ONTHANK.